United States Patent [19]
Hinkel

[11] Patent Number: 6,024,195
[45] Date of Patent: Feb. 15, 2000

[54] HYDRODYNAMIC TORQUE CONVERTER WITH A LINK TO TURBINE BLADES FOR A LOCKUP CLUTCH

[75] Inventor: Rüdiger Hinkel, Heidenfeld, Germany

[73] Assignee: Mannesmann Sachs AG, Schweinfurt, Germany

[21] Appl. No.: 09/182,251

[22] Filed: Oct. 29, 1998

[30] Foreign Application Priority Data

Oct. 29, 1997 [DE] Germany .................... 197 47 699

[51] Int. Cl.[7] ............... F16D 33/00; F16H 45/02
[52] U.S. Cl. ................ 192/3.28; 192/3.29; 192/3.3
[58] Field of Search ................. 192/3.29, 3.28, 192/3.3, 3.31

[56] References Cited

U.S. PATENT DOCUMENTS 4,240,532 12/1980 Blomquist ................... 192/3.28
5,553,693 9/1996 Schoder et al. ............... 192/3.29
5,575,363 11/1996 Dehrmann et al. ............ 192/3.3
5,660,258 8/1997 Bacon et al. .................. 192/3.29

FOREIGN PATENT DOCUMENTS 44 23 640 A1 6/1995 Germany ................... 45/2

Primary Examiner—Rodney H. Bonck
Assistant Examiner—Tisha D. Waddell
Attorney, Agent, or Firm—Cohen, Pontani, Lieberman & Pavane

[57] ABSTRACT

A hydrodynamic torque converter with a lockup clutch in which links are provided at turbine blades for engagement of a driver provided at a piston. The transmission of torque from the converter housing via the piston is conducted via the driver to the link of the turbine blade and in turn to the outer torus of the turbine blade and via a turbine hub, to a driven shaft. A torsional vibration damper is arrangeable between the piston and the link of the turbine blade.

10 Claims, 6 Drawing Sheets

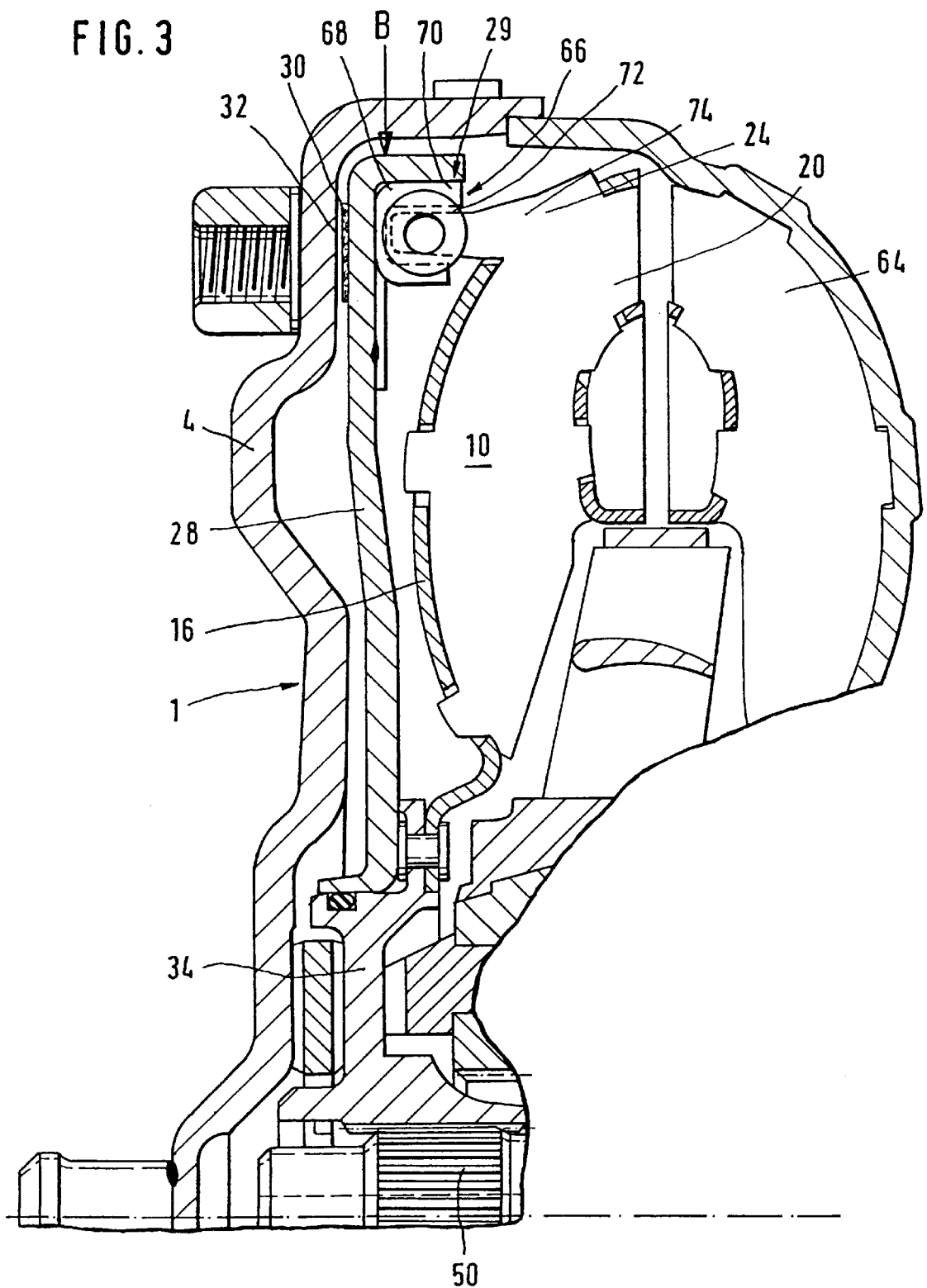

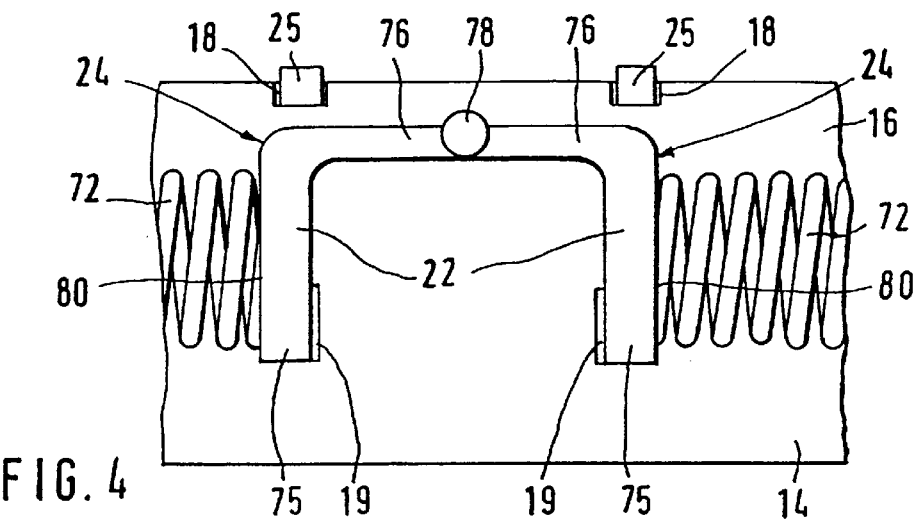
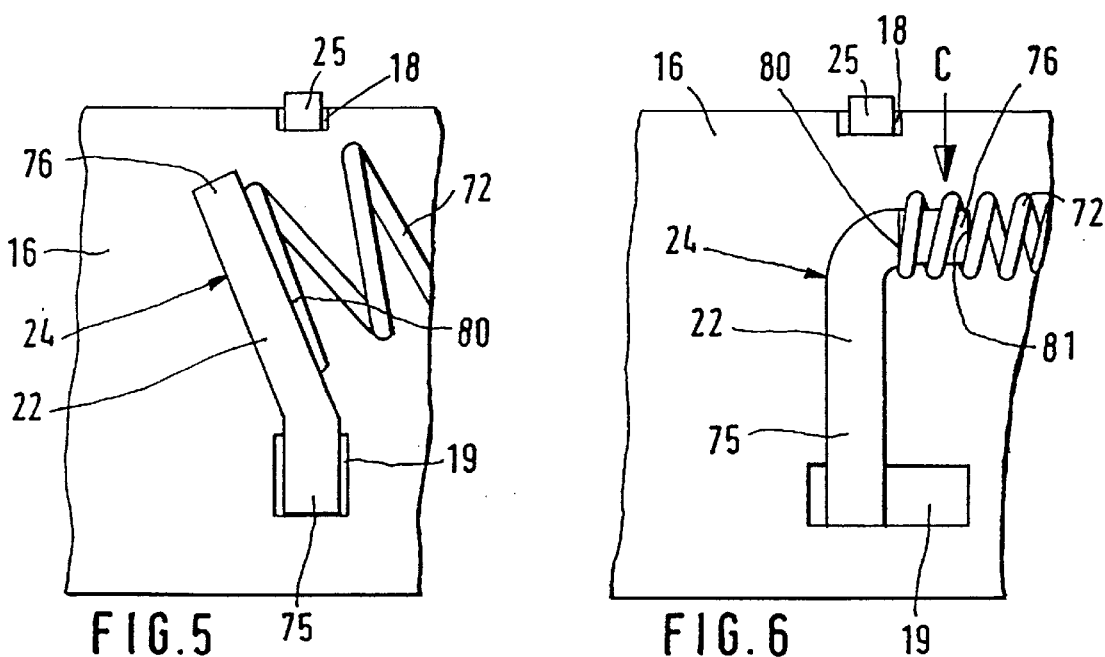
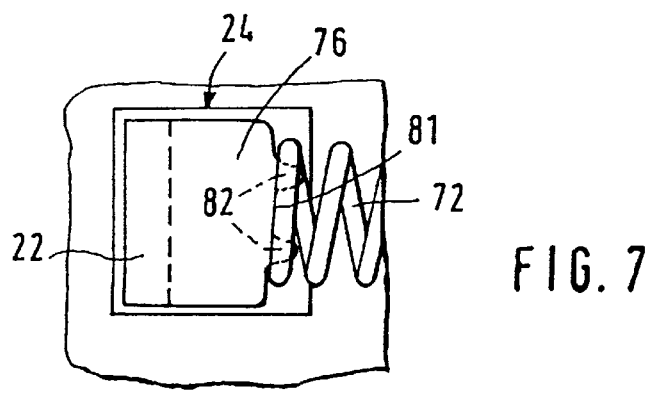

HYDRODYNAMIC TORQUE CONVERTER WITH A LINK TO TURBINE BLADES FOR A LOCKUP CLUTCH

BACKGROUND OF THE INVENTION

1. Field of the Invention

The present invention is directed to a hydrodynamic torque converter having a pump wheel and a turbine wheel, the blades of which are held at a distance from one another by an outer torus, wherein a lockup clutch with a piston rotationally connects the turbine wheel to a housing of the converter.

2. Description of the Related Art

U.S. Pat. No. 4,240,532 discloses a hydrodynamic torque converter with a converter circuit having a pump wheel and a turbine wheel, wherein each of these wheel has a blade arrangement to form flow chambers, these blades being interconnected on the outer side and on the inner side by means of a stiffener. Together, the outer stiffeners form an outer torus and the inner stiffeners together form an inner torus. Tongues are fastened in the radial outer region to the outer torus which, like the inner torus, holds the turbine blades at a predetermined angular distance from one another. These tongues serve as control elements for an energy accumulator of a torsional vibration damper of a lockup clutch, wherein the energy accumulator is supported in the circumferential direction by its counter-side at a holder which is fixedly connected with the piston of the lockup clutch. The piston is mounted on the hub of the turbine wheel and is rotationally connected, via the torsional vibration damper, with the turbine wheel which is in turn operatively connected, via the hub, with a driven shaft serving as a driven element. When the piston is brought into contact with a converter housing, a rotational connection can be produced from the converter housing to the piston, and therefore to the driven shaft, via a friction zone having a friction facing.

While there is nothing objectionable about the functioning of a torque converter of the kind mentioned above, the rotational connection between the lockup clutch and the turbine wheel represents a relatively complicated arrangement due to the plurality of tongues. In addition, when the tongues are welded to the outer torus of the turbine wheel, an uneven heating is brought about by the welding process and deformation stresses can accordingly be introduced in the outer region of the turbine wheel. This results in undesirable imbalances at the turbine wheel.

SUMMARY OF THE INVENTION

The object of the present invention is to provide a hydrodynamic torque converter with a lockup clutch in such a way that it can be connected with a turbine wheel in the region of the outer torus of the turbine wheel without stresses in the simplest possible manner in technical and structural respects.

The inventive hydrodynamic torque converter has a housing which contains a converter circuit including a pump wheel and the turbine wheel. The pump wheel and the turbine wheel each have respective blades configured to form respective blade arrangements which define flow chambers. The outer torus is arranged to maintain the respective blades at a predetermined angular distance from one another. The turbine wheel is operatively connectable with a driven element. The lockup clutch has a piston which is in a rotational connection with the turbine wheel by means of a friction zone configured at the converter housing.

By providing a link at a predetermined number of the turbine blades, which projects over the outer torus and extends substantially in the direction of the piston, additional structural component parts producing a connection to the piston, e.g., tongues fastened to the outer torus, are omitted. Therefore, on the one hand, the torque converter makes do with a reduced quantity of structural component parts compared to the known solutions and, on the other hand, since the link penetrates the outer torus, deformation stresses in the turbine wheel caused by welding do not occur. This advantage need not be gained at the cost of increased expenditure for construction or manufacturing, since, on the one hand, the outer torus in turbine wheels already has recesses for accommodating projections of the turbine blade for positioning the latter at the outer torus relative to the other turbine blades. An already existing recess is simply penetrated by a projection of the turbine blade that is now larger in the axial direction in particular. The production of the turbine blade does not present any disadvantages with respect to manufacture since a die used for stamping the turbine blade allows the link to be stamped at the same time. In a subsequent plastic deformation process at the turbine blade, a tool required for this purpose is constructed in such a way that it also enables a construction of the drier such that it can realize its function in an optimum manner.

Fastening the turbine blades by spot welding or laser welding, for example, enables the turbine blades to be exactly positioned in the turbine wheel. However, this step is preferable even when fastening a turbine blade without the link according to the present invention, and therefore does not represent a disadvantage with respect to manufacturing technique. When the turbine wheel is constructed in this way, a working engagement can be produced by arranging of a corresponding driver at the piston, preferably enabling axial relative movement between the piston and turbine wheel, on the one hand, and between the driver and link on the other hand, while a connection which is fixed with respect to rotation is effected in the direction of rotation. However, as in another embodiment of the present invention, an energy accumulator of torsional vibration damper is provided between a driver at the piston and a link, viewed in the circumferential direction, wherein both the driver and the link act as a control element for the energy accumulator. When a torsional vibration damper is introduced between the link of the turbine wheel and the driver of the piston, it is advantageous, as set forth in the claims, that the link, in particular, is constructed in a special manner to achieve advantages. Thus, due to the fact that two links of turbine blades arranged adjacent to one another in the circumferential direction are bent toward one another and the respective free ends of the links are connected with one another, a control element for the energy accumulator is achieved which has an extremely high resistance to deformation in the circumferential direction even when especially high torques are introduced. Further, in that a part of the link facing the energy accumulator is oriented at a predeterminable angle relative to the outer torus, it is possible for the energy accumulator to be held in such a way that it is subjected to bending away from the turbine wheel and toward the piston when flexed under load. Accordingly, given a suitable supporting arrangement at the piston, the energy accumulator is prevented from damaging the turbine wheel. Special steps for guiding the energy accumulator is prevented from damaging the turbine wheel. Special steps for guiding the energy accumulator can be done away with entirely when, in accordance with an embodiment of the present invention, a bent portion is provided in the circumferential direction at the free end of the link on the piston side and this bent portion is provided with a guide protuberance for engaging in the contacting energy accumulator.

Regardless of the construction of the connection between the link of the turbine wheel and the piston, this connection is preferably provided in the circumferential region of the turbine wheel and piston because the loading of the structural component parts is lowest in this location when a given torque is introduced.

The construction according to the present invention is usable in a lockup clutch having only one friction facing arranged axially between the converter housing and piston and in which the piston has the driver for the link of the turbine blade. Furthermore, the inventive torque converter is used in constructions in which one or more plates are preferably formed with friction facings on both sides. The plates are provided between the converter housing and the piston. When there is only one plate, this plate is provided, with the driver for the link of the turbine blades, whereas, when a plurality of plates are provided, each of these plates has a driver of this kind and each of the drivers extends at a different angle relative to the link of the turbine blades in order to compensate for the different axial spacing of the respective plates relative to the link of the turbine blades.

The relative spacing of the turbine blades on the circumferential side thereof should be predetermined in a particularly precise manner especially in the construction according to the present invention because the links are also used to control energy accumulators of the torsional vibration damper. In order to ensure the required accuracy with respect to position, the connection between outer torus and turbine blade can be carried out in a positioning device which is preferably annular and has receiving pockets at determined angular intervals relative to one another for each link of the turbine blade. In order to facilitate the insertion of each link into a receiving pocket, these receiving pockets are preferably constructed so as to be larger than the link. However, by supplementing every receiving pocket with an aligning spring which extends vertical to the driver of the turbine blade, a situation is created such that the turbine blade presses against a defined edge of the receiving pocket and the turbine blade is accordingly given a defined position inside the receiving pocket. Since all of the receiving pockets of the positioning device are constructed in this way, the turbine blades are held in an accurate position relative to one another circumferentially, while, at the same time, the outer torus contacts a corresponding torus support of the positioning device. By introducing a contact pressure force on the turbine blades, preferably by means of stiffeners which serve to form the inner torus, the turbine blades and the stiffeners of the inner torus and outer torus are brought into a relative position in which a fixed connection can be produced, for example, by spot welding or laser welding. The turbine wheel formed in this way can then be removed from the positioning device and inserted into the torque converter.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 3 corresponds to FIG. 1, with a torsional vibration damper between a piston of the lockup clutch and a link at a turbine blade of a turbine wheel;

FIG. 4 shows a detail of the lockup clutch in FIG. 3 in view in direction B with a fixed connection between the links of two adjacent turbine blades;

FIG. 5 shows a link of a turbine blade at a predetermined inclination to the outer torus;

FIG. 6 shows a link at the turbine blade with a guide device for an energy accumulator of the torsional vibration damper;

FIG. 7 shows a view of the link according to FIG. 6 in viewing direction C;

DETAILED DESCRIPTION OF THE PRESENTLY PREFERRED EMBODIMENTS

Figure 1:
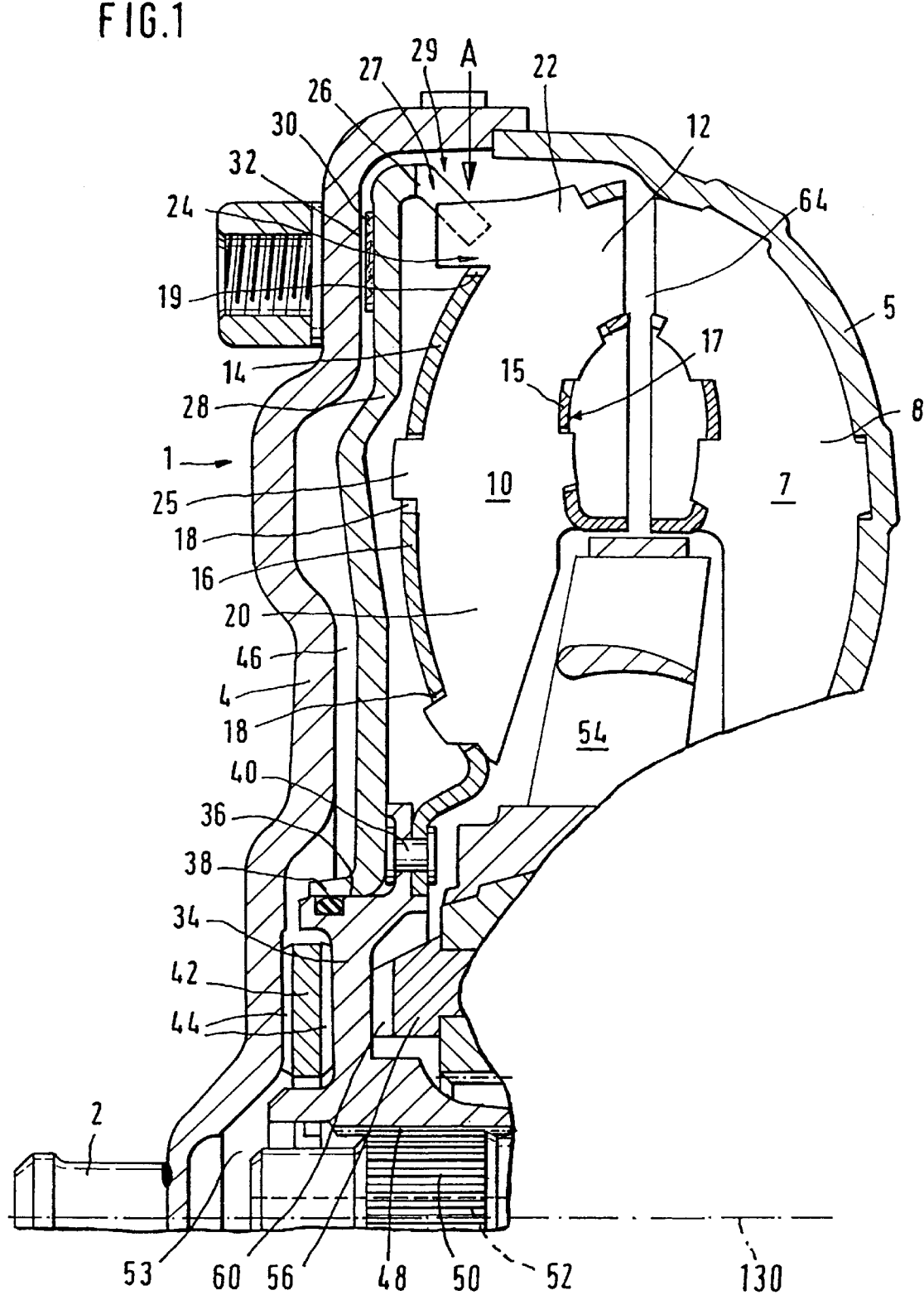
FIG. 1 shows an upper half of a longitudinal section through a lockup clutch at a torque converter of the present invention.

FIG. 1 shows principally those areas in a hydraulic torque converter in which a lockup clutch 29 is provided for the transmission of torque from converter housing 1, via a piston 28, to a driven shaft 50. The torque converter is not shown and described in its entirety since such torque converters are known from the prior art, for example, from German Reference DE 44 23 640 A1.

The torque converter shown in FIG. 1 has the converter housing 1 which is rotatable about a center axis 130 and receives a bearing pin 2 in a fixed manner. A primary wall 4 extends radially outward from the bearing pin 2 and is connected in a known manner with a pump cover 5 of a pump wheel 7 so as to be fixed with respect to rotation relative to the pump cover 5. A pump blade arrangement 8 is provided in the pump wheel 7 in cooperation with a turbine blade arrangement 12 of a turbine wheel 10. The turbine wheel 10 has an external stiffener 14 which in conjunction with the pump cover 5 forms an outer torus 16, while an inner stiffener 15 together with a corresponding stiffener at the pump wheel 7 forms an inner torus 17. Cutouts 18 are provided in the radial center and radial inner areas of the outer torus 16 for the passage of a blade tab 25 which is provided at every turbine wheel blade 20 of the turbine blade arrangement 12. Cutouts 19 are provided at the radial outer area of the outer torus 16 for an axial shoulder 22 which is arranged at every one of the turbine wheel blades 20. While the blade tabs 25 act only to produce a fixed connection between the turbine blade 20 and the outer torus 16, the axial shoulder 22 additionally assumes the function of a link 24 to a driver 27 provided at the piston 28 of the lockup clutch 29. The driver 27 is formed in each instance by a cutout 26 for the link 24 within the axial shoulder 22 at the piston 28, wherein the axial shoulder 22 extends in a radial direction to the turbine wheel 10.

Figure 2:
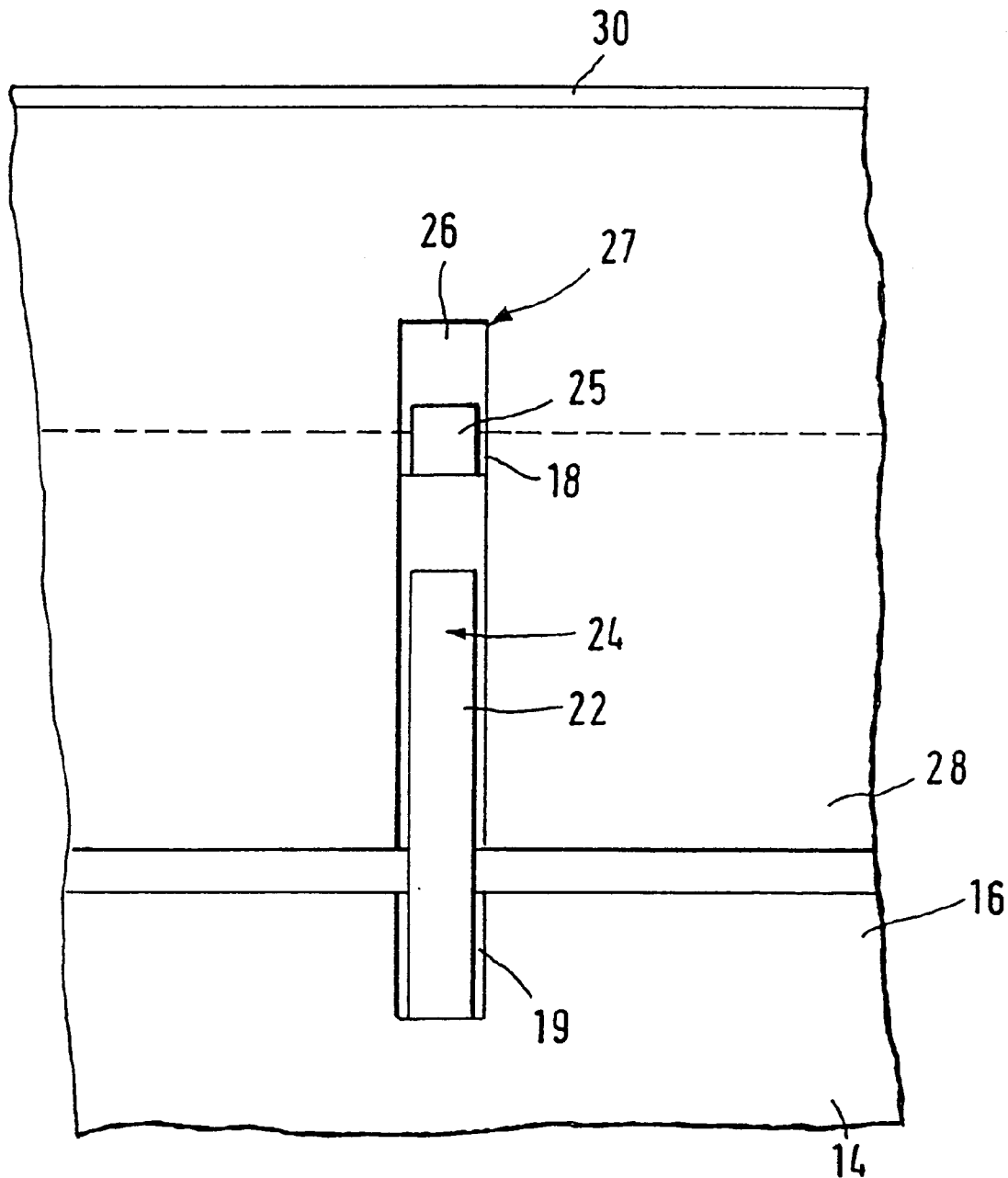
FIG. 2 shows a detail from FIG. 1 in viewing direction A.

As can be seen particularly from FIG. 2, the link 24 projects into the cutout 26 in such a way that a relative movement is enabled in the axial direction between the driver 27 and the turbine blade 20, but rotation is transmitted with only minimal play, if any. This is necessary because the piston 28 is movable axially relative to the primary wall 4 of the converter housing 1 in order to come into contact, 32 friction facing 30, with a friction zone 32 at the converter housing 1. When acted upon by pressure by a converter circuit 64 proceeding from the side facing the turbine wheel 10, while the piston 28 is pushed away from the converter housing 1 a chamber 46 is loaded axially between the converter housing 1 and the piston 28, so that the friction facing 30 is released from the associated friction zone 32 at the converter housing 1. In the latter case, torque introduced by the converter housing 1 is conducted in a known manner via the converter circuit 64, that is, the pump wheel 7, to the turbine wheel 10, and then via a turbine hub 34 having a toothing 48 in a radial inner region thereof to the driven shaft 50 which engages in the toothing 48 so as to be fixed with respect to rotation relative to it. The connection of the outer torus 16 with the turbine hub 34 is made by riveting 40. The chamber 46 is acted upon by overpressure, as was mentioned above, via a center bore 52 in the driven shaft 50, wherein incoming hydraulic fluid, after exiting from the center bore 52 at the drive-side end of the driven shaft 50, flows into a space 53 and, from there, via channels 44 of an axial bearing 42 radially outward into the chamber 46. When pressure is removed from the center bore 52, the hydraulic fluid flows out of the chamber 46 via the channels 44 of the axial bearing 42 radially inward back into the space 53 and is then conveyed out of the torque converter via the center bore 52. In order to follow the respective pressure ratios in the torque converter, the piston 28 is supported on the turbine hub 34 so as to be axially displaceable.

It is clear that, because of the connection between the piston 28 and the turbine wheel 10 via the driver 27 acting on the link 24 of the turbine wheel blades 20, a torque to be transmitted from the converter housing 1, via the friction facing 30, to the piston 28 is conducted to the turbine wheel 10 and from the turbine wheel 10 to the driven shaft 50 via the turbine hub 34. In the other end position of the piston 28, as was already stated, the turbine wheel 10 is set in rotation hydrodynamically via the pump wheel 7, wherein this rotation is conducted via the outer torus 16 to the turbine hub 34 and from the turbine hub 34 to the driven shaft 50. It should be mentioned that the converter circuit 64, in addition to the pump wheel 7 and the turbine wheel 10, has a stator or guide wheel 54 arranged axially there between. The piston 28 is arranged on a sliding surface 36 of the turbine hub 34 and has, for improved support in this area, a bevel 38 which extends in the direction of the primary wall 4 of the converter housing 1.

The guide wheel 54 is positioned via an axial bearing 56 relative to the turbine hub 34. The axial bearing 56 has channels or ducts 60 which extend radially outward. Hydraulic fluid supplied via the ducts 60 in a manner known from the above-cited German Reference DE 44 23 640 A1 is conveyed radially outward into the converter circuit 64.

In the embodiment according to FIGS. 1 and 2, in view of the lack of a torsional vibration damper at the lockup clutch 29, occurring torsional vibrations are preferably decreased by slippage between the friction zone 32 and the friction facing 30. For this purpose, a corresponding pressure difference must be built up between the converter circuit 64 and the chamber 46.

FIG. 3, on the other hand, shows another embodiment in which a torsional vibration damper 66 is provided axially between the piston 28 of the lockup clutch 29 and the turbine wheel 10. The torsional vibration damper 66 has retaining means 68 which are fastened to the piston 28 comprising a first controlling element 70 which is configured on the radial inside of the lockup clutch 29, for example by a bent portion at the retaining means 68. The first controlling element 70 acts on an energy accumulator 72 which is formed as a helical spring and is supported at the other end at the link 24 of the corresponding turbine wheel blade 20, the link 24 therefore acting as a second controlling element 74. As soon as the piston 28 is acted upon by overpressure proceeding from the converter circuit 64 in such a way that the friction facing 30 contacts the primary wall 4 of the converter housing 1, torque is conducted from the converter housing 1 to the piston 28, as was already described. The piston 28 transmits the torque to the retaining means 68 and then, via the first controlling element 70, to the energy accumulator 72 which in turn transmits the torque to the second controlling element 74 of the link 24 of the turbine wheel blade 20. When torsional vibrations occur, sudden loading decreases in the area of the energy accumulator 72. As soon as the torque arrives at the turbine wheel blade 20, it is transmitted to the driven shaft 50 via the outer torus 16 and the turbine hub 34, as was already described.

In a further embodiment, when extremely low deformation is required at the link 24 as in the case of support of the energy accumulator 72, according to FIG. 4, the links 24 of two of the turbine wheel blades 20 are arranged adjacent to one another in the circumferential direction and constructed in such a way that each has, facing one another, a bent portion 76 following an axial portion 75. The free ends of the bent portions 76 are attached to one another by a weld 78. When the energy accumulators 72 make contact with contact faces 80 of the two circumferential sides, the two adjacent links 24 are supported against one another in the circumferential direction and are therefore loaded to an extremely high degree with very little deformation. The cutout 26 in the driver 27 at the piston 28 is correspondingly wide in order to receive this connection of the two links 24.

The contact faces 80, for the energy accumulators 72 at the links 24 also occur in another embodiment according to FIG. 5. However, adjacent to the axial portion 75 of the link 24, the bent portion 76 is constructed in such a way that the contact face 80 extends at a predetermined angle to the outer torus 16. This angle is preferably selected in such a way that the energy accumulator 72 contacting the contact face 80 I deflected in the direction of the piston 28, so that, in the event that the energy accumulator 72 bulges out under load when torques are introduced, the bulging is effected in the direction of the piston 28 and not in the direction of the outer torus 16. Advantageously, the relatively sensitive outer torus 16 of the turbine wheel 10 is protected.

Returning to FIG. 3, it is noted that the retaining means 68 are provided therein for positioning the torsional vibration damper 66, and especially for positioning the energy accumulator 72. In order to dispense with the retaining means 68 of this kind, if required, the bent portion 76 is constructed, according to yet a further embodiment as in FIG. 6. The axial portion 75 of the link 24 has, in addition to the contact face 80 for the energy accumulator 72, a guide protuberance 82 at its circumferential end 81. The guide protuberance 82 engages in the energy accumulator 72 and accordingly not only allows the latter to make contact, but also guides it. FIG. 7 clearly shows this construction of the guide protuberance 82.

Figure 8:
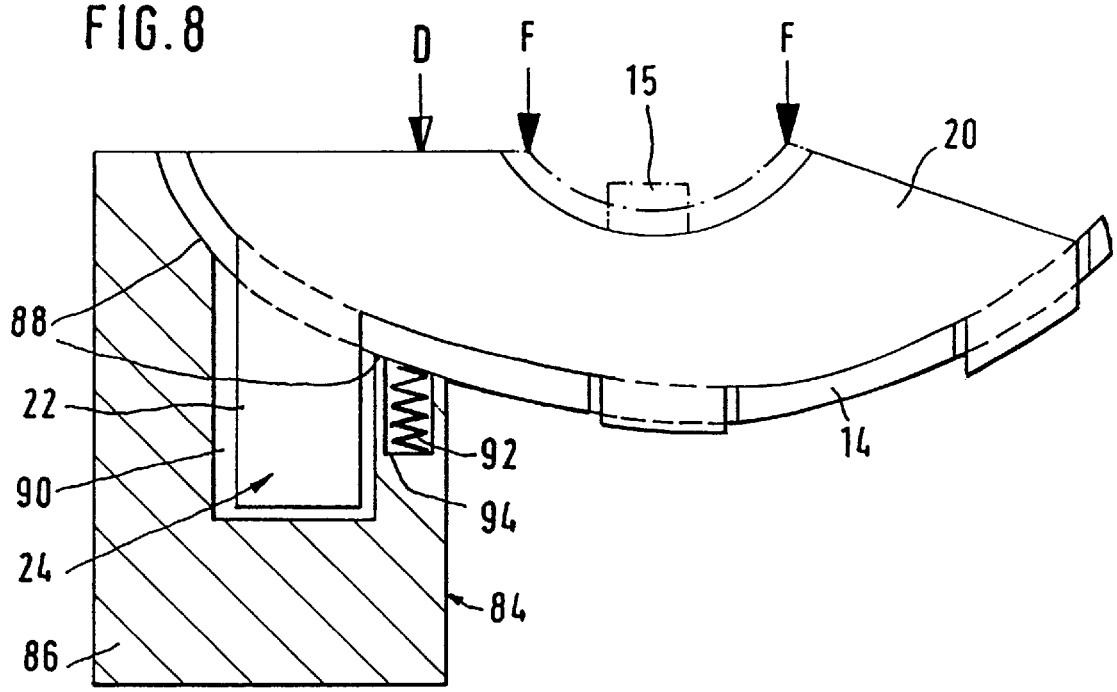
FIG. 8 shows a positioning device for dimensionally accurate fastening of turbine blades to an outer torus.
Figure 9:
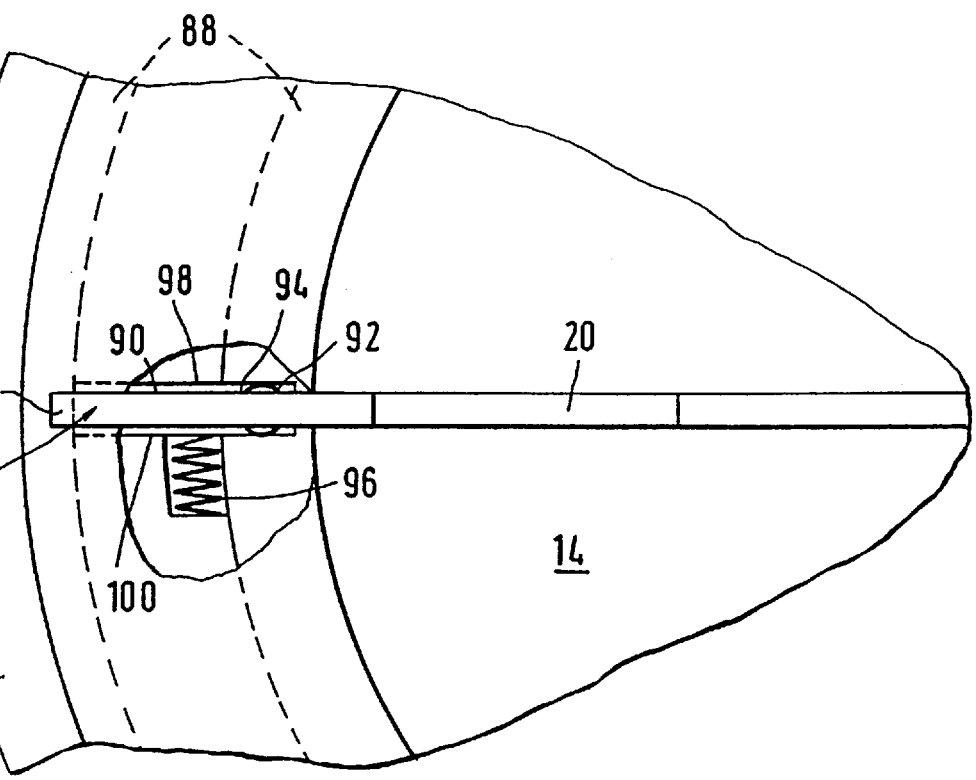
FIG. 9 shows a view of the positioning device according to FIG. 8 in viewing direction D.

Since the links 24 at the individual turbine wheel blades 10 act the second controlling elements 74 of the torsional vibration damper 66, as was explained in detail above, the individual turbine wheel blades 20 are fastened in exact position relative to the outer torus 16 in order to prevent uneven loading of the energy accumulators 72. For this purpose, according to a further embodiment as in FIG. 8 and 9, a positioning device 84 is used which preferably has an annular bearing block 86. The bearing block 86 is provided with a torus support 88 of the outer torus 16 and has, at predetermined angular intervals relative to one another, receiving pockets 90 in which the link 24 of the turbine wheel blade 20 is inserted. As can be seen from FIGS. 8 and 9, the respective link 24 is inserted into the receiving pocket 90 with play. A counter-spring 92 arranged in a recess 94 ensures that the external stiffener 14 of the outer torus 16 is held without play on the torus support 88 of the positioning device 84 when contact pressure forces F are introduced via the inner stiffener 15 of the inner torus 17. Further, as can be seen from FIG. 9, an alignment spring 96 is provided extending in the circumferential direction so as to urge the link 24 against a side of the recess 94 opposite the alignment spring 96, the side being designated as an alignment edge 98. Due to the fact that the alignment spring 96 presses the line 24, and accordingly the entire turbine wheel blade 20, away from a counter-edge 100, the turbine wheel blade 20 is moved into a unique position relative to the outer torus 16, so that the play with which the link 24 is arranged in the associated receiving pocket 90 is not noticeable. The turbine wheel blades 20 which are positioned in the outer torus 16 are thereby subsequently attached to the outer torus 16 by spot welding or laser welding. The finished turbine wheel 10 is removed from the positioning device 84 when the introduction of force F is canceled.

Figure 10:
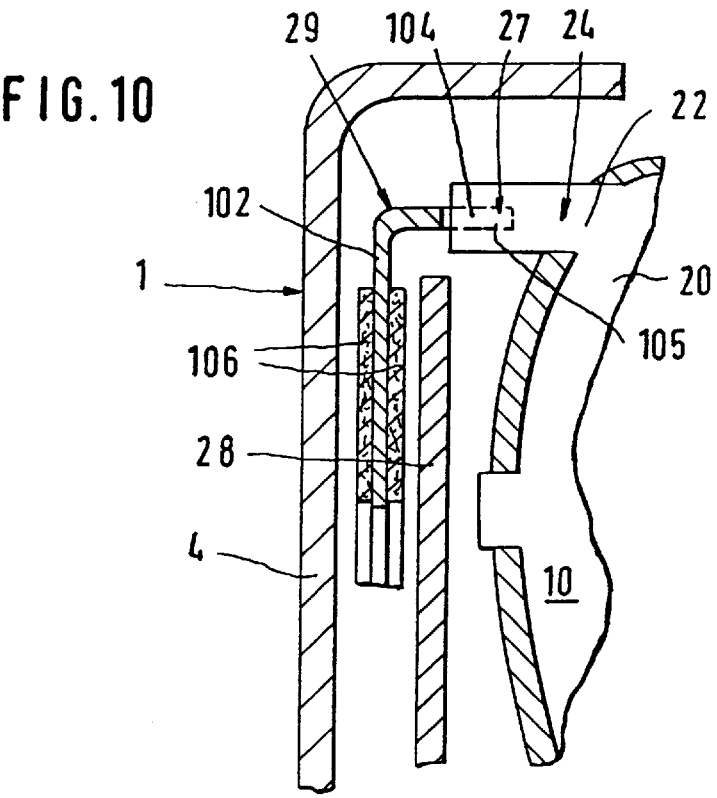
FIG. 10 shows the lockup clutch with a plate provided axially between the converter housing and the piston.

FIG. 10 shows a further advantageous embodiment in which the lockup clutch 29 has friction facings 106 at a plate 102 which is provided axially between the primary wall 4 of the converter housing 1 and the piston 28 which is, in turn, arranged axially between the plate 102 and the turbine wheel 10. The friction facings 106 are applied to both sides of the plate 102, wherein the plate 102 has, for every one of the links 24, to fingers 104 which act as the drivers 27 for the link 24 and engage around the link 24 in the circumferential direction virtually without play, but allow a relative movement in the axial direction. The fingers 104 accordingly have between them, viewed in the circumferential direction, a clearance 105 to allow for the engagement of the link 24. The lockup clutch 29 takes effect when the piston 28 which is mounted so as to be axially movable is acted upon by the converter circuit 64 with pressure in such a way as to clamp the friction facings 106 between itself and the primary wall 4. Accordingly, movements transmitted from the converter housing 1 to the piston 28 are conducted, via the plate 102 and the drivers 27, to the link 24 of the corresponding turbine wheel blade 20 and then transmitted to the driven shaft 50 in the manner described above.

Figure 11:
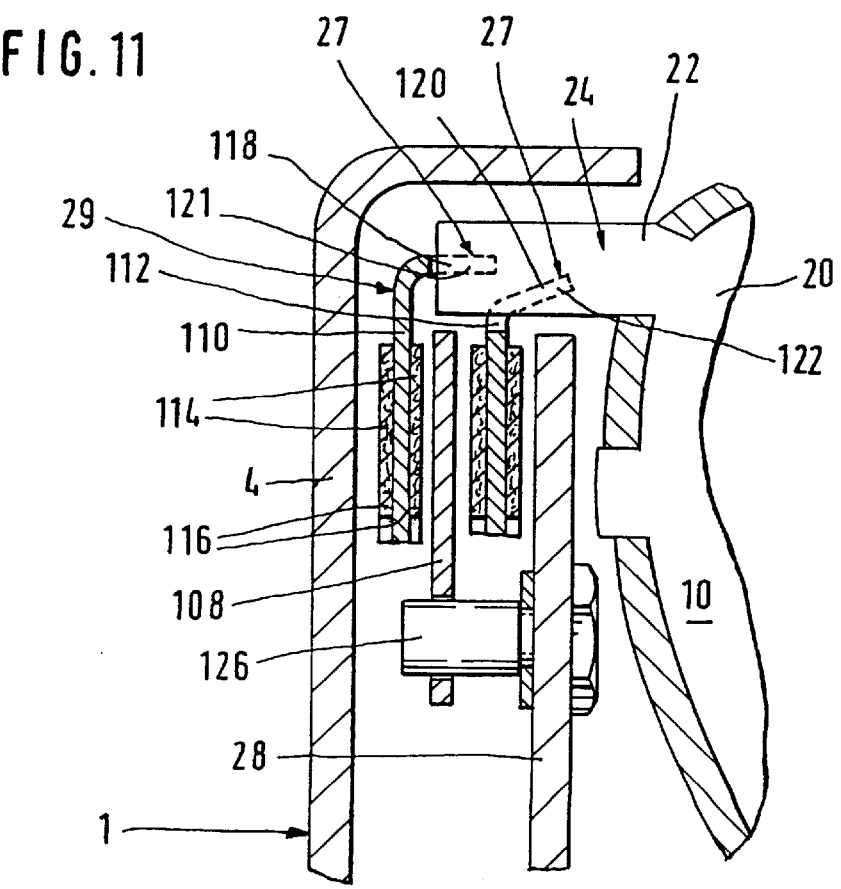
FIG. 11 shows the lockup clutch with two plates arranged axially between the converter housing and the piston.

According to still another embodiment as in FIG. 11, respective first and second plates 110, 112 are arranged between the primary wall 4 and the piston 28. Each of the plates 110, 112 is formed with the driver 27 having fingers 118, 120 between which, viewed in the circumferential direction, there is provided a clearance 121, 122 for receiving the link 24 of the associated turbine wheel blades 20. The fingers 118, 120 extend at different angles relative to the link 24 allowing for different axial spacing of the respective plates 110, 112 relative to the turbine wheel 10 so as not to interfere with one another. Friction facings 114 are provided on both sides of the first plate 110 and friction facings 116 are provided on both sides of the second plate 112. All of the friction facings 114, 116 enter into frictional engagement when the piston 28 is moved in the direction of the primary wall 4 when overpressure is produced in the converter circuit 64 and the piston 28 accordingly clamps the plate 112 between itself and a counter-holder 108, while the other plate 110 is clamped between the counter-holder 108 and the primary wall 4. The counter-holder 108 is guided so as to be axially displaceable by means of a spacer 126 fastened to the piston 28.

The invention is not limited by the embodiments described above which are presented as examples only but can be modified in various ways within the scope of protection defined by the appended patent claims.

I claim:

1. A hydrodynamic torque converter, comprising: a housing; a converter circuit including at least one pump wheel and at least one turbine wheel, each of the at least one pump wheel and each of the at least one turbine wheel having a respective plurality of blades configured to form a respective blade arrangement so as to define flow chambers; an outer torus arranged to maintain the respective plurality of blades at a predetermined angular distance from one another; a driven element being operatively connectable with the at least one turbine wheel; a lockup clutch having a piston in rotational connection with the at least one turbine wheel and having at least one friction zone in connection with the converter housing; means for rotationally connecting the piston and the turbine wheel, the connecting means including a respective link arranged at each of a predetermined number of the plurality of turbine blades so as to project over the outer torus and extend substantially in a direction of the piston, and a driver arranged at the piston so that the link engages the driver; an energy accumulator extending in a circumferential direction; and a control mechanism provided at the piston for controlling the energy accumulator, one circumferential end of the energy accumulator being supported at the link of an associated one of the turbine blades, each link having a contact face arranged so as to contact the energy accumulator, the contact face being configured to extend at least along a portion of the link projecting over the outer torus in the direction of the piston and at an angle to the turbine wheel so as to produce a pre-curvature of the energy accumulator in a direction facing away from the turbine wheel.

2. The hydrodynamic torque converter according to claim 1, wherein the driver engages the link so as to be moveable in an axial direction and fixed in a circumferential direction.

3. The hydrodynamic torque converter according to claim 1, wherein the driver is configured as a cut-out in the turbine wheel, the link being configured as an axial shoulder at the turbine blade so as to extend toward the piston and project into the cut-out.

4. The hydrodynamic torque converter according to claim 1, wherein links of adjacent turbine blades are directed toward one another and fixedly connected with one another.

5. The hydrodynamic torque converter according to claim 1, wherein the link and the driver are arranged in a outer circumferential area of a respective one of the turbine blade and the piston.

6. The hydrodynamic torque converter according to claim 1, further comprising positioning means for exactly angularly aligning the turbine blades relative to the outer torus, the positioning means including a body having receiving pockets at predetermined angular intervals relative to one another for each link of the turbine blade, and a torus support arranged between the receiving pockets in the circumferential direction so as to support the outer torus.

7. A hydrodynamic torque converter, comprising: a housing; a converter circuit including at least one pump wheel and at least one turbine wheel, each of the at least one pump wheel and each of the at least one turbine wheel having a respective plurality of blades configured to form a respective blade arrangement so as to define flow chambers; an outer torus arranged to maintain the respective plurality of blades at a predetermined angular distance from one another; a driven element being operatively connectable with the at least one turbine wheel; a lockup clutch having a piston in rotational connection with the at least one turbine wheel and having at least one friction zone in connection with the converter housing; means for rotationally connecting the piston and the turbine wheel, the connecting means including a respective link arranged at each of a predetermined number of the plurality of turbine blades so as to project over the outer torus and extend substantially in a direction of the piston, and a driver arranged at the piston so that the link engages the driver; an energy accumulator extending in a circumferential direction; and a control mechanism provided at the piston for controlling the energy accumulator, one circumferential end of the energy accumulator being supported at the link of an associated one of the turbine blades, the link having a bent portion provided at a free end of the link facing the piston in the circumferential direction, a guide protuberance being arranged at the bent portion so as to engage in the energy accumulator.

8. A hydrodynamic torque converter, comprising: a housing; a converter circuit including at least one pump wheel and at least one turbine wheel, each of the at least one pump wheel and each of the at least one turbine wheel having a respective plurality of blades configured to form a respective blade arrangement so as to define flow chambers; an outer torus arranged to maintain the respective plurality of blades at a predetermined angular distance from one another; a driven element being operatively connectable with the at least one turbine wheel; a lockup clutch having a piston in rotational connection with the at least one turbine wheel and having at least one friction zone in connection with the converter housing; means for rotationally connecting the piston and the turbine wheel, the connecting means including a respective link arranged at each of a predetermined number of the plurality of turbine blades so as to project over the outer torus and extend substantially in a direction of the piston, and a driver arranged at the piston so that the link engages the driver; positioning means for exactly angularly aligning the turbine blades relative to the outer torus, the positioning means including a body having receiving pockets at predetermined angular intervals relative to one another for each link of the turbine blade, and a torus support arranged between the receiving pockets in the circumferential direction so as to support the outer torus; and a plurality of aligning springs, a respective one of said lining springs being arranged in each of the receiving pockets so as to act perpendicular to the links so as to hold the link in contact with a side of the pocket opposite the spring so that the opposite side of the pocket acts as an aligning edge.

9. A hydrodynamic torque converter, comprising: a housing; a converter circuit including at least one pump wheel and at least one turbine wheel, each of the at least one pump wheel and each of the at least one turbine wheel having a respective plurality of blades configured to form a respective blade arrangement so as to define flow chambers; an outer torus arranged to maintain the respective plurality of blades at a predetermined angular distance from one another; a driven element being operatively connectable with the at least one turbine wheel; a lockup clutch having a piston in rotational connection with the at least one turbine wheel and having at least one friction zone in connection with the converter housing; means for rotationally connecting the piston and the turbine wheel, the connecting means including a respective link arranged at each of a predetermined number of the plurality of turbine blades so as to project over the outer torus and extend substantially in a direction of the piston, and a driver arranged at the piston so that the link engages the driver; and at least one plate arranged between the piston and the housing so as to be movable in the axial direction and fixed with respect to rotation, the driver being arranged on the plate, a plurality of the plates being arranged between the piston and the housing so that a first driver of a first one of the plurality of plates extends at a first angle to the link and a second driver of a second one of the plurality of plates extends at a second angle to the link, the second angle being different than the first angle.

10. A hydrodynamic torque converter, comprising: a housing; a converter circuit including at least one pump wheel and at least one turbine wheel, each of the at least one pump wheel and each of the at least one turbine wheel having a respective plurality of blades configured to form a respective blade arrangement so as to define flow chambers; an outer torus arranged to maintain the respective plurality of blades at a predetermined angular distance from one another; a driven element being operatively connectable with the at least one turbine wheel; a lockup clutch having a piston in rotational connection with the at least one turbine wheel and having at least one friction zone in connection with the converter housing; means for rotationally connecting the piston and the turbine wheel, the connecting means including a respective link arranged at each of a predetermined number of the plurality of turbine blades so as to project over the outer torus and extend substantially in a direction of the piston, and a driver arranged at the piston so that the link engages the driver; and at least one plate arranged between the piston and the housing so as to be movable in the axial direction and fixed with respect to rotation, the driver being arranged on the plate, the driver of each of the plates respectively has fingers spaced apart from one another at a distance forming a clearance in which the link is received.

* * * * *